(12) United States Patent
Papadimitriou et al.

(10) Patent No.: US 7,155,369 B2
(45) Date of Patent: Dec. 26, 2006

(54) AUTONOMOUS NON-DESTRUCTIVE INSPECTION

(76) Inventors: Wanda G. Papadimitriou, P.O. Box 801496, Houston, TX (US) 77280;
Stylianos Papadimitriou, P.O. Box 801496, Houston, TX (US) 77280

( * ) Notice: Subject to any disclaimer, the term of this patent is extended or adjusted under 35 U.S.C. 154(b) by 45 days.

(21) Appl. No.: 10/995,692

(22) Filed: Nov. 22, 2004

(65) Prior Publication Data
US 2006/0111852 A1    May 25, 2006

(51) Int. Cl.
*G01B 5/28* (2006.01)
(52) U.S. Cl. .......................... 702/185; 702/34; 702/35; 702/183; 324/228
(58) Field of Classification Search ............... 702/185, 702/6, 9, 13, 1, 17, 33, 117, 33.36, 38–40, 702/56–59, 76, 81–84, 113, 183, 184, 189–191, 702/195; 324/216, 217, 220–222, 228, 232, 324/237, 238, 240, 242, 243, 227, 226, 260
See application file for complete search history.

(56) References Cited

U.S. PATENT DOCUMENTS

| | | | | |
|---|---|---|---|---|
| 4,629,985 A | * | 12/1986 | Papadimitriou et al. | .... 324/232 |
| 4,710,712 A | * | 12/1987 | Bradfield et al. | ........... 324/227 |
| 5,210,704 A | * | 5/1993 | Husseiny | ...................... 702/34 |
| 5,430,376 A | * | 7/1995 | Viertl | ........................... 324/227 |
| 5,648,613 A | * | 7/1997 | Kiefer | .......................... 73/611 |
| 5,777,891 A | * | 7/1998 | Pagano et al. | ................ 702/39 |
| 5,914,596 A | * | 6/1999 | Weinbaum | .................. 324/228 |
| 6,115,674 A | * | 9/2000 | Brudnoy et al. | .............. 702/38 |
| 6,359,434 B1 | * | 3/2002 | Winslow et al. | ............ 324/220 |
| 6,594,591 B1 | * | 7/2003 | Clark et al. | .................... 702/35 |

OTHER PUBLICATIONS

The Inspection of Used Coiled Tubing; Steve Papadimitriou and Roderic K. Stanley; Mar. 28, 1994, 12 pages.

* cited by examiner

*Primary Examiner*—Hal Wachsman
(74) *Attorney, Agent, or Firm*—The Matthews Firm

(57) ABSTRACT

Autonomous non-destructive inspection equipment provides automatic and/or continuous inspection and evaluation of a material under inspection. The inspection equipment comprises at least one detection sensor and at least one detection sensor interface for a computer. The signals are communicated from the sensor to the computer. The signals are then conditioned and evaluated according to knowledge already inputted into the computer. The computer iterations are processed until an acceptable conclusion is made regarding the type of imperfection that is detected.

38 Claims, 3 Drawing Sheets

AUTONOMOUS NON-DESTRUCTIVE INSPECTION

TECHNICAL FIELD

This invention relates, generally, to non-destructive inspection and inspection equipment, and more specifically, to provide automatic and/or continuous non-destructive inspection and evaluation to material under inspection, including evaluators and predictors of detected imperfections and useful material life.

BACKGROUND OF THE INVENTION

As is known in the art, materials are selected for use based on criteria including minimum strength requirements, useable life, and anticipated normal wear. Safety factors are typically factored into design considerations to supplement material selection in order to aid in reducing the risk of failures including catastrophic failure. Such failures may occur when the required application strengths exceed the actual material strength. During its life, the material is weakened by external events such as mechanical and/or chemical actions arising from the type of application, repeated usage, hurricanes, earthquakes, storage, transportation, and the like; thus, raising safety, operational, functionality, and serviceability issues throughout the materials life. Non-Destructive Inspection (herein after referred to as "NDI") is carried out, at least in part, in order to verify that the material exceeds the minimum strength requirements for the application.

DETAILED DESCRIPTION OF EMBODIMENTS OF THE INVENTION

To understand the terms associated with the present invention, the following descriptions are set out hereinbelow. It should be appreciated that mere changes in terminology cannot render such terms as being outside the scope of the present invention.

Imperfection Or Flaw: a discontinuity, irregularity, anomaly, inhomogenity, or a rupture in the material under inspection.

Classification: assigning an imperfection to a particular class based on its features.

Defect: an imperfection that exceeds a specified threshold and may warrant rejection of the material under inspection.

Autonomous: able to function without external control or intervention.

Knowledge: a collection of facts and rules capturing the knowledge of one or more specialist.

Rules: how something should be done to implement the facts.

Figure 1:
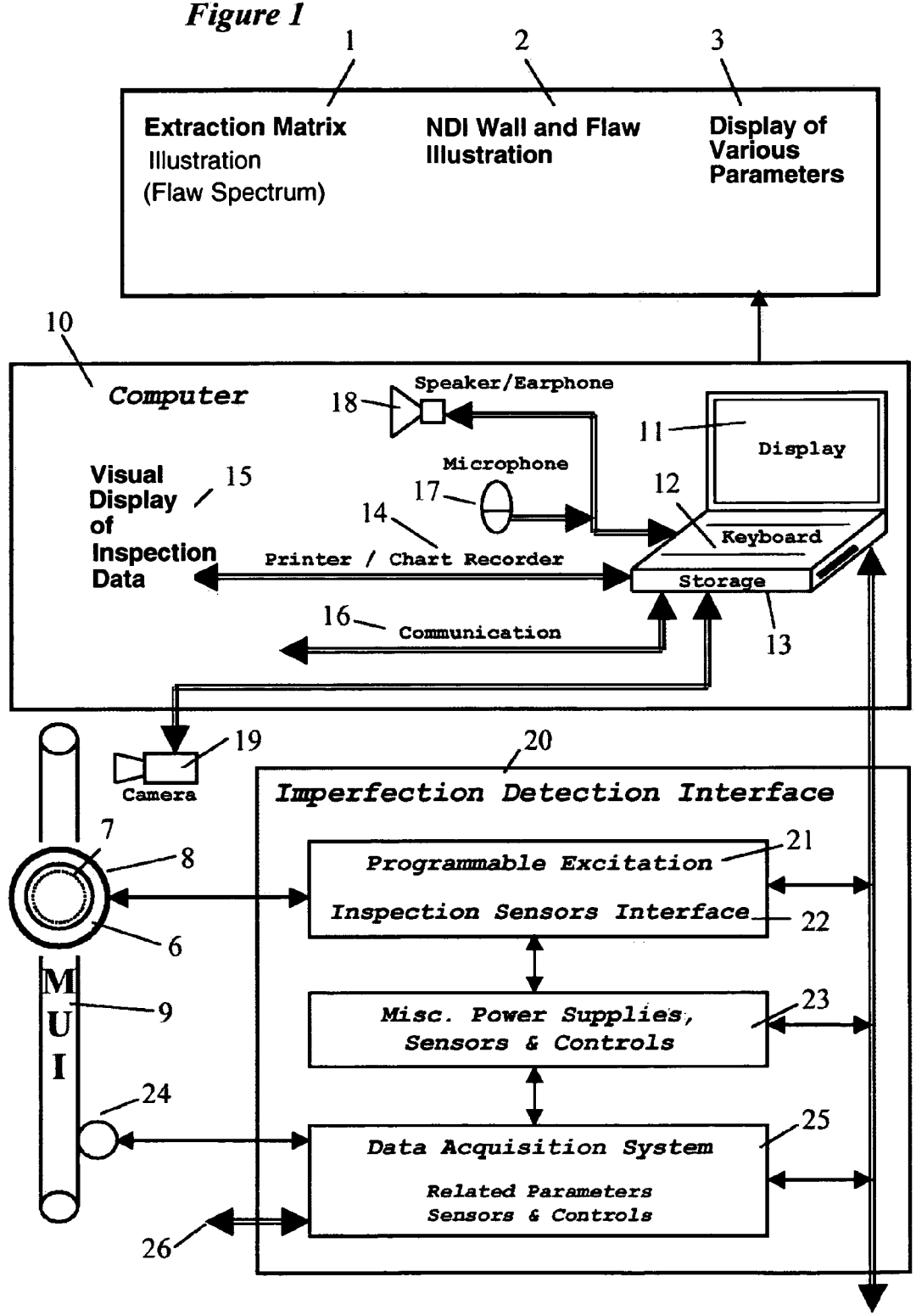
FIG. 1 illustrates a block diagram of an autonomous non-destructive inspection system according to the present invention.

FIG. 1 illustrates a block diagram of an inspection system further illustrating the inspection computer 10, the imperfection detection interface 20, and the preferable information exchange among the components of the inspection equipment. It should be understood that the inspection computer 10 may consist of more than just one computer such as a cluster of interconnected computers. The computer 10 preferably comprises a keyboard 12, display 11, storage capacity 13, for storing and accessing data, a microphone 17, a speaker 18 and a camera 19. It should be understood that the display 11, the keyboard 12, the microphone 17 and the speaker 18 may be local to the computer 10, may be remote, may be portable, or any combination thereof. It should be further understood that camera 19 may comprise more than one camera. Further camera 19 may utilize visible light, infrared light, any other spectrum component, or any combination thereof. The camera 19 may be used to relay an image or a measurement such as a temperature measurement, a dimensional measurement, a comparative measurement, or any combination thereof. It should be appreciated that the stored data may comprise hard disks, floppy disks, compact discs, magnetic tapes, DVDs, memory, and other storage devices. The computer 10 may transmit and receive data through at least one communication link 16 and may send data to a printer or chart recorder 14 for further visual confirmation of the inspection data 15 and other related information. The computer 10 preferably provides for data exchange with the imperfection detection interface 20.

Since its inception in the early 1900s, the NDI industry has utilized a variety of techniques and devices with the majority based on the well known and well documented techniques of magnetic flux leakage, magnetic particle, eddy-current, ultrasonic, radiation, such as x-ray and gamma ray, dye penetrant, and dimensional as well as visual and audible techniques. These techniques have been utilized alone or in combination with each other to address the specifics of the Material-Under-Inspection (herein after referred to as "MUI"9). A list of typical MUI 9 includes, but is not limited to, engine components, rails, rolling stoke, oil country tubular goods (herein after referred to as "OCTG"), chemical plant components, pipelines, bridges, structures, frames, cranes, aircraft, sea going vessels, drilling rigs, workover rigs, vessels, structures, other components of the above, combinations of the above, and similar items.

NDI dictates termination of the material utilization altogether in order to accommodate the inspection process, which, is typically carried out by shipping the material to an inspection facility. The cost of inspection is therefore increased by the transportation cost and the material downtime. In addition, shipping and handling the material, especially after the inspection, may induce damage to the material that could result in an unanticipated early catastrophic failure.

Because of its implementation and the intrusion NDI imposes, typical inspections have been expensive and were thus performed at rare intervals or not performed at all. For example, NDI costs of OCTG can be as high as 30% of the material replacement cost. The novel autonomous inspection system, control, and method that is presented hereinbelow can be used as an "advisor" to an inspector or as a stand alone low-cost inspection system. It should be appreciated that as an "advisor" the system can be used in conjunction with typical or conventional inspection systems at the typical intervals such conventional systems are used.

As a stand alone system, the autonomous inspection system can bring the cost of inspection down due to its non-intrusive implementation and on-going inspection. The non-intrusiveness allows for the inspection to be carried out, in many applications, while the MUI 9 is in operation and without requiring the operation to stop (such as when running OCTG into or out of a well). Further, because of the nature of the constant inspection, major defects are more likely to be found and minor defects can be better monitored over time to predict the useable life of the MUI 9. It is well known that the presence of any imperfection alters the expected (designed) life-cycle of the MUI 9 and thus impacts its remaining useful life. Thus, it should be appreciated that the autonomous inspection system and method would increase safety and reliability as useful life predictors would be more accurate and lead to MUI 9 repair/replacement prior to catastrophic failures of the MUI 9 as well as premature replacement due to concerns when the conventional inspection periods are spaced far apart.

The Autonomous Non-Destructive Inspection (NDI) detects and classifies imperfections without altering the MUI using mostly indirect techniques. Pipe for example, is manufactured based on metallurgy, geometry, strength, and other parameters. The pipe's response to magnetic or ultrasonic excitation is not one of the design criteria. Magnetic flux leakage based NDI, attempts to detect imperfections using magnetism. However, the response of an imperfection to a magnetic field is not directly related to its effect on the strength of the MUI, preferably the ultimate inspection goal. Secondly, its response to a magnetic field is partially controlled by its previous magnetic state. Thus, with most conventional inspection systems magnetic flux leakage based NDI has been used as a flag for a verification crew. The inspector monitors the magnetic flux leakage traces and instructs the verification crew to investigate a particular indication (possible defect). Thus, with most conventional inspection systems, the MUI owners or operators typically specify that the verification crew investigate at least ±six inches on either side of an indication. It is also not uncommon for the inspector to recognize certain imperfections from the chart, given enough experience.

A common way to reduce verification time (which translates to cost) is to assume that all the imperfections are of a certain type and are all located on a specific surface of the material. Then, the signal amplitude and/or width can be used as a pass/fail indicator. Typically, such a process has very limited application specific success.

Regardless of the specific inspection technique utilized, the autonomous NDI device will preferably scan the material after each use, fuse the inspection data with relevant material use parameters, and automatically determine the MUI 9 status. Thus, a function of the imperfection detection interface 20 is to generate and induce excitation 21 into the MUI 9 and detect the response, of the MUI 9, to the excitation 21. Preferably, at least one inspection head 8 is mounted on or inserted in the MUI 9 and the head 8 may be stationary or travel along the MUI 9. It should be appreciated that the inspection head 8 can be applied to the inside as well as the outside of the MUI 9. It should be understood that the inspection head 8, illustrated herein, may comprise at least one excitation inducer 6 and one or more inspection sensors 7 mounted such that the inspection needs of MUI 9 are substantially covered. The inspection computer 10 preferably both programs and controls the excitation 21 and the inspection head 8 as well as receives data from the inspection head sensors 7 through the inspection sensor interface 22. The inspection head 8, excitation 21, and the inspection sensor interface 22 may be combined within the same physical housing. In an alternative embodiment, the inspection sensors 7 may comprise computer capability and memory storage and thus the sensors 7 can be programmed to perform many of the tasks of the computer 10 or perform functions in tandem with the computer 10. It should be also understood that the application of the excitation 21 and the inspection of the MUI 9 may be delayed such as NDI utilizing the residual magnetic field whereby the MUI 9 is magnetized and it is inspected at a later time.

Computer 10 also controls and monitors a plurality of power supplies, sensors and controls 23 that facilitate the inspection process including but not limited to safety features. Further, computer 10 monitors/controls the data acquisition system 25 which preferably assimilates data from at least one sensor 24. The sensor 24 preferably provides data such as, but not limited to, MUI 9 location (feet of MUI 9 passing through the inspection head 8), penetration rate (speed of MUI 9 moving through the inspection head 8), rate of rotation (rpm), and coupling torque. It should be appreciated that the data to be acquired will vary with the specific type of MUI 9 and thus the same parameters are not always measured/detected. Furthermore and in addition to the aforementioned inspection techniques, computer 10 may also monitor, through the data acquisition system 25, parameters that are related to the inspection or utilization of the MUI 9. Such parameters may include, but not be limited to, the MUI 9 internal pressure, external pressure, such as the wellhead pressure, temperature, flow rate, tension, weight, load distribution, and the like. Further, such parameters may be displayed in a manner illustrated by element 3 in FIG. 1. Preferably, these parameters are measured or acquired through sensors and/or transducers mounted throughout the inspection area, such as a rig. For ease of understanding, these various sensors and transducers are designated with the numeral 26. The STYLWAN Rig Data Integration System (RDIS-10) is an example of such an inspection system (STYLWAN is a trade mark of Stylwan, Incorporated).

Preferably, the inspection head 8 relates time-varying continuous (analog) signals, such as, but not limited to, echo, reluctance, resistance, impedance, absorption, attenuation, or physical parameters that may or may not represent an imperfection of the MUI 9. It should be appreciated, by those in the art, that sensor 7 signals generally include, but are not limited to, noise and useable data that may indicate some imperfection and/or defect. Further, imperfections generally comprise all received signals and may include MUI 9 design features such as tapers, major and minor defects or other MUI 9 conditions such as surface roughness, hardness changes, composition changes, scale, dirt, and the like. Still further, defects may be viewed as an imperfection of a specific magnitude or beyond a certain threshold. Typically, those in the art have always relied on both an inspector and a manual verification crew for the interpretation of the inspection signals and any subsequent disposition of the MUI 9. However, based on extensive strength-of-materials knowledge, it is well known that the severity of an MUI 9 imperfection is a function of its geometry, its location, and the applied loads. It is also well known, in the art, that this information cannot be readily obtained by a verification crew when the imperfections in question are located underneath coating, in the near subsurface, in the mid wall, or in the internal surface of the MUI 9. Any destructive action, such as removing any coating or cutting up the MUI 9 is beyond the scope of non-destructive inspection. Detailed signal analysis can extract the pertinent information from the NDI signals. Preferably, such detailed signal analysis would utilize signals that are continuously related in form, kind, space, and time. The signals are preferably band limited and are converted to time-varying discrete digital signals which are further processed, by the computer 10, utilizing an extraction matrix to decompose the signals and extract relevant features in a manner illustrated by element 1 in FIG. 1.

The extraction matrix is compiled through a software program, that was published in 1994 and it is beyond the scope of this patent, and decomposes the converted digital signals into relevant features. The extraction matrix may be adjusted to decompose the signals into as few as two (2) features, such as, but not limited to, the classical NDI presentation of wall and flaw in a manner illustrated by element 2 in FIG. 1. It should be understood that no theoretical decomposition upper limit exists, however, fifty (50) to two hundred (200) features are practical. The selection of the identifier equations, further described herein below, typically sets the number of features. In the exemplary RDIS-10, the decomposed signals are known as the flaw spectrum 1 (see element 1, FIG. 1).

Humans are highly adept in recognizing patterns, such as facial features or the flaw spectrum 1 and readily correlating any pertinent information. Therefore, it is easy for the inspector to draw conclusions about the MUI 9 by examining the flaw spectrum 1. During the inspection, the inspector further incorporates his/her knowledge about the MUI 9 present status, his/her observations, as well as the results of previous inspections. The success of this inspection strategy of course, solely depends on how well the inspector understands the flaw spectrum 1 data and the nuances it may encompass.

Computers can run numerical calculations rapidly but have no inherent pattern recognition or correlation abilities. Thus, a program has been developed that preferably derives at least one mathematical procedure to enable the computer 10 to automatically recognize the patterns and nuances encompassed in decomposed inspection data streams such as presented in the flaw spectrum 1. The detailed mathematical procedures are described hereinbelow and enable one skilled in the art to implement the autonomous NDI described herein without undue experimentation.

Figure 2:
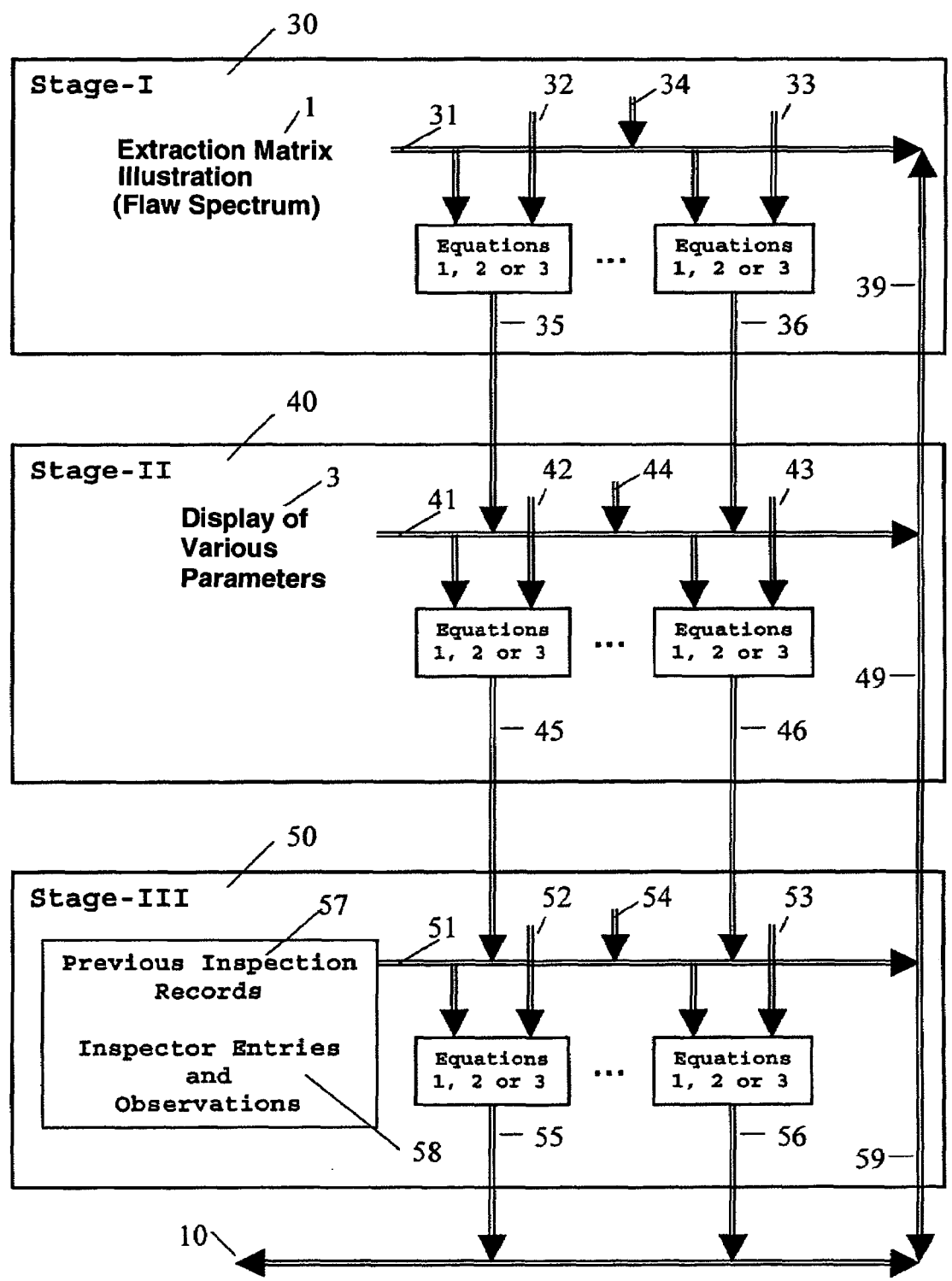
FIG. 2 illustrates a block diagram of the signal processing of an autonomous non-destructive inspection system according to the present invention.

FIG. 2 illustrates a block diagram of an inspection data processing sequence that allows the creation of a software flowchart and the translation of the practice to a computer program. For stand-alone operation, the autonomous NDI must be optimal in regard to the inspection criteria and application limitations, commonly defined by approximations and probabilities which are referred to herein as constrains. It should be understood therefore, that the autonomous NDI state variables must be tuned for optimal performance under different constrains depending on the MUI 9 and its application. The fundamental operation of the autonomous NDI is performed by the identifier equations which preferably capture the optimal mutual features in accordance to the constrains. It should be understood that a number of identifier equations may be paralleled and/or cascaded, each one utilizing a different set of optimal mutual features. Furthermore, it should be understood that the processing of the identifier equations may be carried out by a single computer 10 or by different computers in a cluster without effecting the overall result.

The first stage identifier equations, with elements denoted as $a_{jk}$ 32, 33, use for input N features 31 mostly derived from the flaw spectrum 1. Additional features may be provided by fixed values referred to herein as bias 34, 44, 54. Bias may be a single constant or a sequence of constants that may be controlled, but not limited, by time or by the MUI 9 length. Backwards chaining 39 limits irrelevant processing and enhances stability while forward chaining 59 propagates features to later stages or it may inform computer 10 that an MUI 9 condition has been determined and no further analysis is required. It should be further understood that both forward and backward chaining may be direct, through memory, through a bucket-brigade, or any combination of the above. It should be further understood that all or any subsystem of the autonomous NDI may be implemented as a casual system or as a non-casual system. In a casual implementation only past and present features 31 are utilized. In a non-casual implementation, features 31 are utilized through memory, through a bucket-brigade, or any combination of the above thus allowing for the use of future values of the features 31. Future values of the features 31 may be used directly or indirectly as signal masks and may be propagated through the forward chaining 59. Utilization of future values of features 31 increases the autoNDI stability and reduces the probability of a conflict In Equations 1–3, shown below, such features are denoted as Xa. Based on the constrains, the identifier equations reduce the features 31 and bias 34 to identifiers 35, 36 denoted as Ya of the form:

$$Ya_{ij} = M \sum_{k=1}^{N} a_{ik} Xa_{kj} \quad \text{(Equation 1)}$$

The identifiers Ya 35, 36 can be fed back through the backwards chaining 39, can be used directly through the forward chaining 59, can be used as variables to equations or as features 41, 51 in following stages or in their most practical form, as indexes to tables (arrays) which is shown in Equation 2 for clarity.

$$Ya_{ij} = T_{(M \sum_{k=1}^{N} a_{ik} Xa_{kj})} \quad \text{(Equation 2)}$$

where T is a Look-up Table or Array.

Another useful identifier form is shown in Equation 3.

$$Ya_{ij} = M \left[ 1 + e^{-\sum_{k=1}^{N} a_{ik} Xa_{kj}} \right]^{-1} \quad \text{(Equation 3)}$$

where M is a scaling constant or function.

It should be understood that each stage may comprise multiple identifier equations utilizing equations 1, 2, or 3. There is no theoretical upper limit for the number of identifiers calculated, however, five (5) to ten (10) identifiers are practical.

Some of the identifiers Ya 35, 36 may be sufficient to define the disposition of the MUI 9 alone and thus propagate to the output stage 59 while others may become features for the second stage 40 of identifier equations along with features 41 pertinent to the Ya identifiers, all denoted as Xb. It should be appreciated that in the exemplary STYLWAN RDIS-10, depending on the constrains, those features can be obtained from the operator interface, from the computer 10 memory, from the camera 19, or by connecting directly to the STYLWAN RDIS-10 Data Acquisition System transmitters that measure various parameters illustrated FIG. 1 (3). (STYLWAN is a trademark of Stylwan, Incorporated). Examples of such transmitters include the OCI-5000 series manufactured by OLYMPIC CONTROLS, Inc, Stafford, Tex., USA, such as transmitters that measure pressure (OCI-5200 series), temperature (OCI-5300 series), speed and position (OCI-5400 series), weight (OCI-5200H series), fluid level (OCI-5200L series), flow (OCI-5600 series), dimensions (OCI-5400D series), AC parameters (OCI-5400 series), DC parameters (OCI-5800 series), as well as other desired parameters (OCI is a trademark of Olympic Controls, Incorporated). The second stage 40 identifier equations, with elements denoted as $b_{lm}$, produces identifiers 45, 46 denoted as Yb of similar form as the Ya identifiers 35, 36.

Again, some of the identifiers Yb may be sufficient to define the disposition of the MUI 9 alone and thus propagate to the output stage 59 while others may become features for the third stage 50 identifier equations along with features pertinent to the Yb identifiers, all denoted as Xc. For the RDIS-10, depending on the constrains, those features can be obtained from data or functions entered by the operator 58, stored in historical data 57, or other predetermined sources (not illustrated). It should be understood that this process may repeat until an acceptable solution to the constrains is obtained, however, three stages are typically adequate for the exemplary STYLWAN RDIS-10 (STYLWAN is a trademark of Stylwan. Incorporated).

For the determination of the $a_{jk}$ coefficients, the tuning of the identifier equations, a set of flaw spectrums 1 of known similar imperfections that are pertinent to a current inspection application are required. These data sets, of flaw spectrums 1, are referred to herein as baseline spectrums. Preferably, all the $a_{jk}$ coefficients are initially set equal. It should be understood that because this is an iterative process the initial values of the $a_{jk}$ coefficients could also be set by a random number generator, by an educated guess, or by other means for value setting.

Since the baseline spectrums are well known, typically comprising data taken for similar imperfections, the performance measure and the constrains are clearly evident and the coefficients solution is therefore objective, although the selection of the imperfections may be subjective. By altering the coefficient values through an iterative process while monitoring the output error an acceptable solution would be obtained.

There are multiple well-known techniques to minimize the error and most of these techniques are well adept for computer use. It should be appreciated that for the autonomous NDI limited number of features a trial-and-error brute force solution is feasible with the available computer power. It should be further expected that different solutions would be obtained for every starting set of coefficients. Each solution is then evaluated across a variety of validation spectrum as each solution has its own unique characteristics. It is imperative, therefore, that an extensive library of both baseline spectrums and validation spectrums must be available for this evaluation. It should be further understood that the baseline spectrums cannot be used as validation spectrums and visa versa. Furthermore, it should be understood that more than one solution may be retained and used for redundancy, conflict resolution, and system stability. Still further in applications of the autonomous NDI, the terms "acceptable" or "good enough" are terms of art to indicate that, in a computational manner, the computer has completed an adequate number of iterations to compile an answer/solution with a high probability of accuracy.

Once a set or sets of coefficients are obtained, the number of non-zero coefficients is preferably minimized in order to improve computational efficiency. This is important because each identifier equation is just a subsystem and even minor inefficiencies at the subsystem level could significantly affect the overall system real time performance. Multiple techniques can be used to minimize the number of non-zero coefficients. A hard threshold would set all coefficients below a predetermined set point to zero (0). Computers typically have a calculation quota, so a quota threshold would set to zero a sufficient number of lower value coefficients to meet the calculation quota. A soft threshold would subtract a non-zero constant from all coefficients and replace the negative values with zero (0). Since an error measure exists, the new set of coefficients can be evaluated, the identifier equations can be tuned again and the process could repeat until the admissible identifier equation is determined. It is preferred that multiple admissible identifier equations are determined for further use. It should be appreciated that although the preference for multiple admissible identifiers may appear to complicate potential resolutions, the use of computer power makes a large number of iterations feasible.

For the inspection of materials, an acceptable solution would always contain statistics based on false-positive and false-negative ratios. A false-positive classification rejects good material while a false-negative classification accepts defective material. Using more than one identifier equation lowers the false ratios more than the fine-tuning of a single identifier equation. It should be understood that this process theoretically provides an infinite number of solutions, as an exact formulation of the inspection problem is elusive and always based on constrains. Furthermore, for a solution that can be obtained with a set of coefficients, yet another solution that meets the performance measure may also be obtained by slightly adjusting some of the coefficients. However, within the first three to five proper iterations the useful solutions become obvious and gains from additional iterations are mostly insignificant and hard to justify.

Once all of the Stage-I 30 admissible identifier equations have been determined, their identifiers become features in Stage-II 40 along with the additional features 41, bias 44, and forward and backwards chaining 49. The starting set of baseline spectrums is then processed through the admissible identifier equations and the results are used to tune the Stage-II 40 identifier equations in a substantially identical process as the one described above for the Stage-I 30. The process repeats for the Stage-III 50 identifier equations and any other stages (not illustrated) that may be desired or necessary until all the admissible subsystems are determined and the overall system design is completed. It should be appreciated that in practice, preferably only two to five stages will be necessary to obtain required results. When the final coefficients for all of the equations are established, the overall system performance may be improved by further simplifying the equations using standard mathematical techniques.

A previous inspection with the same equipment provides the best historical data 57. The previous inspection system output, denoted as $Ys_{(-1)}$, is ideally suited for use as a feature 51 in the current inspection as it was derived from substantially the same constrains. Furthermore, more than one previous inspection 57 may be utilized. Features 51 may be backwards chained 49, 39. Multiple historical values may allow for predictions of the future state of the material and/or the establishment of a service and maintenance plan.

In conventional inspection systems, previous state data, that was derived through a different means under different constrains, could not necessarily be used directly or used at all. If utilized, the data would more likely have to be translated to fit the constrains of the current application. It should be appreciated that such a task may be very tedious and provide comparatively little payoff. For example, there is no known process to translate an X-Ray film into Magnetic-Flux-Leakage (MFL) pertinent data. However, the system described herein allows for the use of such data in a simple and direct form. In the X-Ray example, the opinion of an X-Ray specialist may be solicited regarding the previous state of the material. The specialist may grade the previous state of the material in the range of one (1) to ten (10), with one (1) meaning undamaged new material. The X-Ray specialist opinion is an example of bias 34, 44, 54.

Bias 34, 44, 54 may not necessarily be derived in its entirety from the same source nor be fixed throughout the length of the material. For example, information from X-Rays may be used to establish the previous material status for the first 2,000 feet of an 11,000 foot coiled tubing string. Running-feet may be used to establish the previous material status for the remainder of the string except the 6,000 foot to 8,000 foot range where OD corrosion has been observed by the inspector 58. From the available information, the previous material status for this string (bias per 1,000 feet') may look like [2, 2, 4, 4, 4, 4, 7, 7, 4, 4, 4] based on length. Other constrains though may impose a hard threshold to reduce the bias into a single value, namely [7], for the entire string.

An example of a bias array would be a marine drilling riser string where each riser joint is assigned a bias based on its age, historical use, Kips, vortex induced vibration, operation in loop currents, visual inspection, and the like. The bias for a single riser joint may then look like [1, 1, 3, 0, 2, 2]. Identifier equations may also be used to reduce the bias array into a bias value or a threshold may reduce the bias into a single value.

The overall system must be feasible not only from the classification standpoint but also from the realization standpoint. In addition to the classification and minimum error, the system constrains also include, but are not limited to, cost, packaging, portability, reliability, and ease of use; all of which should be addressed in each step of the design. The system design preferably must assign initial resources to each level and should attempt to minimize or even eliminate resources whose overall contribution is negligible. This can be accomplished by converting certain features to bias and evaluating the resulting error.

Computer 10 preferably recognizes the imperfection by comparing the final array of identifiers 55, 56, 59 with a stored imperfection template database. Once an imperfection is recognized, computer 10 may verify the correctness of the recognition by further evaluating intermediate identifiers.

Occasionally, the imperfection recognition becomes unstable with the final array of identifiers toggling between two solutions on each iteration. For example, during the inspection of used production tubing, the recognition may bounce back and forth between a large crack or a small pit. Resolution of such instability may be achieved by utilizing intermediate identifiers, by utilizing the previous recognition value, or by always accepting the worst conclusion (typically referred to as pessimistic classification). However, autonomous NDI instability may also be the outcome of improper backwards chaining or even faulty constrains. Slight increase in the coefficients of the backwards chained features may produce an output oscillation thus rapidly locating the problem feature and/or coefficients.

A conflict arises when the final array of identifiers points into two or more different MUI 9 conditions with equal probability. Again, resolution of such conflict may be achieved by utilizing intermediate identifiers, by utilizing the previous recognition value or by always accepting the worst conclusion. However, a definite solution may be obtained by eliminating features that the conclusions have invalidated and by reprocessing the signals under the new rules.

The autonomous NDI is preferably designed to reason under certainty. However, it should also be capable of reasoning under uncertainty. For example, during the inspection of used production tubing of a gas well, rodwear is detected. Since there are no sucker rods in the gas well, the conclusion is that this is either used tubing that was previously utilized in a well with sucker rod or there is a failure in the autonomous NDI. The autonomous NDI could query 58 about the history of the tubing and specifically if it was new or used when initially installed in the well. The answer may be difficult to obtain, therefore a 50—50 chance should be accepted. A bias value may then be altered and the signal may be reprocessed under the new rules.

Alternate coefficients may be stored for use when certain failures are detected. For example, the wellhead pressure transmitter may fail. Upon detection of the failure, the alternate set of coefficients should be loaded for further use. It should be understood that even a simple bias may substitute for the failed transmitter.

Figure 3:
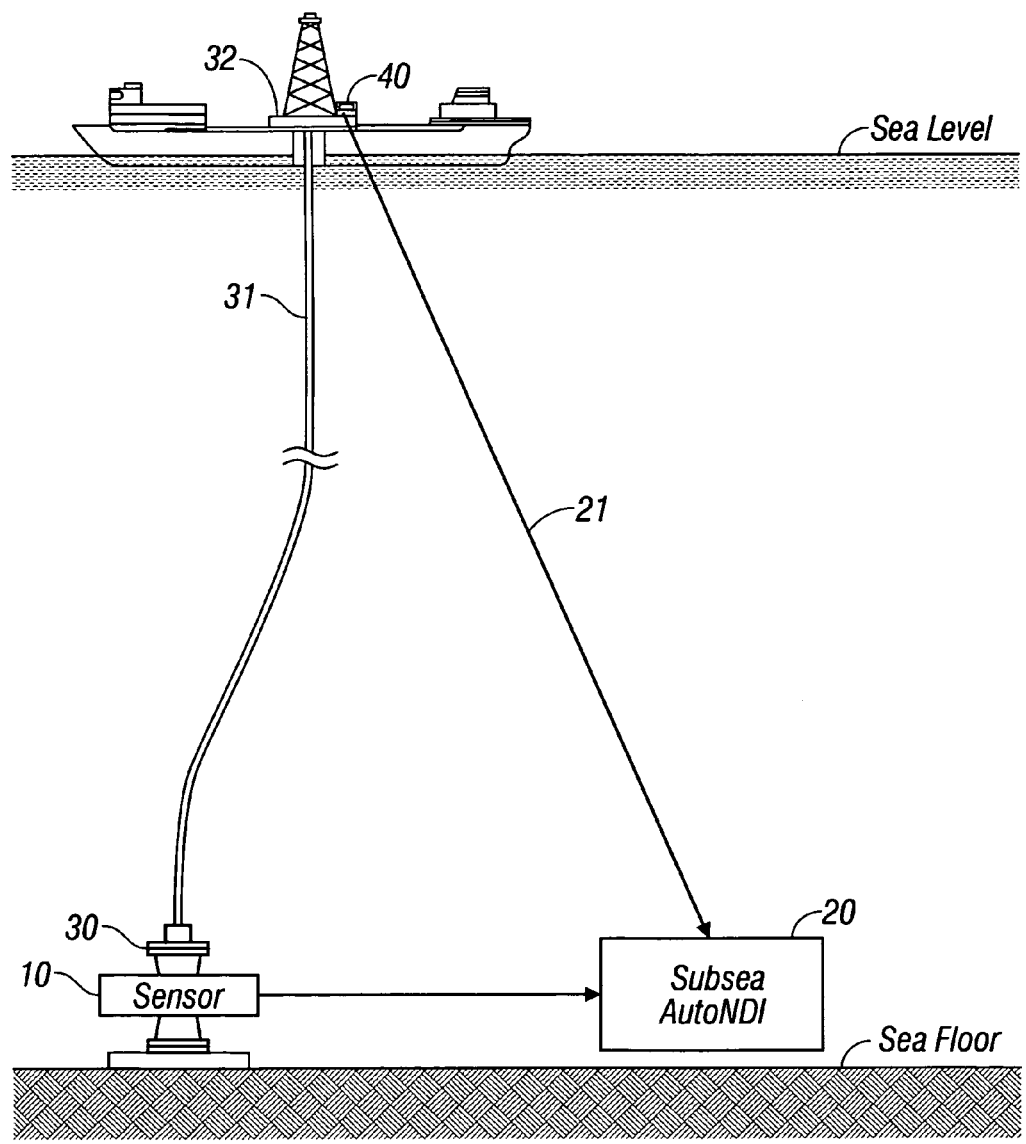
FIG. 3 illustrates a partially pictorial view using an autonomous non-destructive inspection system to locate well equipment according to the present invention.

As illustrated in FIG. 3 an autonomous NDI system can also be used to locate well equipment such as, but not limited to a tool joint. In offshore drilling there may be a need for an emergency disconnect between a drilling rig and the sea-floor wellhead. For example, due to inclement weather, a dynamically positioned rig may no longer be able to maintain its position above the sea-floor wellhead. Typically, such a disconnect is referred to as an Emergency Disconnect Sequence or EDS. A properly executed EDS allows the rig to move off location without damaging the subsea equipment and still maintaining control of the well.

A typical EDS mandates that the drill string is picked up and hung off in the subsea blow-out preventor ("BOP") pipe rams. The sequence typically starts by pulling some of the drill pipe out of the wellbore and then closing the BOP pipe rams on what it is estimated to be the center of a drill pipe joint. The drill string is then slacked off slowly until the tool joint lands on the shoulder of the closed BOP pipe rams. This is typically indicated by a drop in the weight indicator.

Thus, it becomes necessary to estimate the location of the tool joint in the subsea stack with a high degree of confidence otherwise the rubber goods of the BOP pipe rams may become damaged and significantly reduce their effectiveness to hold pressure. Knowing the exact location of the drill pipe tool joint in the subsea stack is critical information as it reduces the likelihood for damage to the BOP pipe rams and further assures that the shear rams will not close on a tool joint.

Due to the high operating pressures endured by the subsea stack, the drill pipe is typically surrounded by materials with a wall thickness in excess of one inch. Placing sensors inside the stack would appear to be the solution, however, this would expose the sensors to the action of the drilling fluids and the drill pipe, thus mandating armor around the sensors. Calculations would reveal that the armor would be of significant thickness itself and would require the redesign of subsea assemblies in order to accommodate the armored sensors and still maintain a desired ID clearance within the bore of the subsea stack.

External sensors can be fitted on existing stack components with minimal or no alteration. However, the exciter (6 in FIG. 1) for the external sensors (7 in FIG. 1) would have to have sufficient power for the excitation to penetrate through the significant wall thickness in order to detect the drill pipe tool joint, thus, the detection system would require high power. Both space and power are extremely limited and of high value on the sea floor and on the subsea stack. Thus, the use of active tool joint detection techniques, such as, but not limited to, electromagnetic, ultrasonic, and radiation would be cost prohibitive.

The present invention overcomes these problems by utilizing a very low power passive tool joint detection technique that can be easily installed on new equipment as well as retrofitted on existing equipment. The locator requires an autonomous NDI 40 unit on the surface in communication with a subsea Autonomous NDI 20. When the drill pipe is tripped into the well, the surface autonomous NDI 40 prepares the drill pipe for both tool joint location and the subsequent inspection. When the drill pipe is tripped out of the well, the surface autonomous NDI 40 inspects the drill pipe and the subsea Autonomous NDI 20 locates the tool joints in the subsea stack. It should be understood that more than one subsea autonomous NDI 20 may be deployed in order to increase the overall system reliability and availability.

The drill pipe or tubular is magnetized at the rig floor while it is tripped into the well. At least one passive sensor 10, such as a coil, is preferably mounted externally on a convenient subsea stack component 30, thus the distance between the pipe rams and the tool joint sensor is fixed and known to the driller. It should be appreciated that a passive sensor may also be mounted internally to a subsea stack component. Active sensors, such as, but not limited to, hall probes, may also be used, placing a higher power requirement on the system. It should be further appreciated that the sensor 10 can also be any other autonomous NDI sensor. It should be further understood that more than one sensor configuration, each of which are known in the art, may be employed to increase the probability of the tool joint identification.

The subsea autonomous NDI 20 is preferably connected to the surface with two wires 21 for both power and communication. The surface autonomous NDI 40, is preferably located on the rig floor 32 of the drilling rig, drill ship or other drilling platform and would inform the driller when a tool joint is inside the sensor. The preference for a subsea autonomous NDI 20 is because of the distance between the sensor and the surface autonomous NDI 40. The typical applications for the tool joint locator are in water depths of more than three hundred feet (300').

The tool joint identification signature is a function of the drill pipe dimensions and the location of the tool joint sensor since different rigs use different drill pipe sizes and different subsea components. Thus, a training sequence would be required to tune the different identifier equations. The coefficients would preferably be stored onboard the subsea autonomous NDI 20 and be selected through the communication link 21. Since the entire function of the subsea autonomous NDI 20 is to detect a tool joint, preferably it would utilize a sufficient number of identifier equations to increase the probability of detection.

It may be seen from the preceding description that a novel autonomous inspection system and control has been provided. Although specific examples may have been described and disclosed, the invention of the instant application is considered to comprise and is intended to comprise any equivalent structure and may be constructed in many different ways to function and operate in the general manner as explained hereinbefore. Accordingly, it is noted that the embodiments described herein in detail for exemplary purposes are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An inspection system to detect imperfections in materials being inspected comprising:
   at least one imperfection detection sensor with an output, said output comprising imperfection signals, from materials being inspected, in a time-varying electrical form;
   at least one computer having at least one imperfection detection interface, wherein said output is in communication with said at least one computer, and wherein said at least one computer converts the imperfection signals to a digital format;
   at least one set of constrains, wherein said at least one set of constrains are inputted into said at least one computer, and wherein said at least one set of constrains guide evaluations by said at least one computer for recognizing the types of imperfections detected by said at least one imperfection detection sensor;
   at least one memory storage for said at least one computer, wherein said at least one set of constrains and said output can be stored;
   a program, said program being executed on said at least one computer, and said program being configured to operate on said converted imperfection signals, wherein said operation is guided by inputted data comprising knowledge of imperfections and/or knowledge of imperfections previously found in the materials being inspected and/or rules for recognizing the types of imperfections;
   said program further comprising at least one mathematical array of coefficients, wherein said coefficients comprise converted and/or decomposed signals from said at least one imperfections detection sensor, and/or baseline data comprising data from known material imperfections and/or historical data comprising data previously gathered from the materials being inspected; and
   said at least one set of constrains further comprise rules, and/or baseline data comprising data from known material imperfection, and/or historical data comprising data previously gathered from the material from the materials being inspected, and wherein said rules, and/or baseline data, and/or historical data are inputted into said at least one computer to manage and evaluate the imperfection signals, wherein said historical data is compiled from a prior non analogous inspection technique, and wherein said historical data is inputted into said at least one computer, to manage and evaluate the imperfection signals.

2. The inspection system of claim 1, further comprising the induction of an excitation into a material and detecting the response to the excitation through said at least one imperfection detection sensor.

3. The inspection system of claim 2, wherein said excitation is controlled by said at least one computer.

4. The inspection system of claim 1, wherein said rules and said knowledge are developed and inputted into said at least one computer prior to an inspection of said materials being inspected.

5. The inspection system of claim 1, wherein said at least one imperfection detection sensor further comprises memory storage, and wherein processing coefficients, and/or processing rules can be stored and accessed by said at least one computer.

6. The inspection system of claim 5, wherein said at least one set of constrains are stored in the memory storage of said at least one imperfection detection sensor.

7. An inspection system to detect imperfections in tubulars used in the exploration, drilling, production and transportation of hydrocarbons comprising:

at least one detection sensor, said at least one detection sensor emitting signals in a time-varying electrical form, wherein the emitted signals are resultant from imperfections present in the tubulars being inspected;

at least one computer having at least one imperfection detection interface, wherein the emitted sensor signals are in communication with said at least one computer, and wherein said at least one computer converts the emitted sensor signals to a digital format;

at least one set of constrains, wherein said at least one set of constrains are inputted into said at least one computer, and wherein said at least one set of constrains guide evaluations by said at least one computer for recognizing the types of imperfections detected by said at least one detection sensor;

at least one memory storage for said at least one computer, wherein said at least one set of constrains and the signals emitted by the at least one detection sensor can be stored;

a program, said program being executed on said at least one computer, and said program being configured to operate on said converted imperfection signals, wherein said operation is guided by inputted data comprising knowledge of imperfections and/or knowledge of imperfections previously found in the tubulars being inspected and/or rules for recognizing the types of imperfections; and said program further comprising at least one mathematical array of coefficients, wherein said at least one mathematical array of coefficients comprise converted and/or decomposed signals from the at least one detection sensor, and/or baseline data comprising data from known imperfections in tubulars, and/or historical data comprising data previously gathered from the tubulars being inspected.

8. The inspection system of claim 7, wherein said at least one detection sensor further comprises memory storage, and wherein processing coefficients, and/or processing data can be stored and accessed by said at least one computer.

9. The inspection system of claim 8, wherein said at least one set of constrains are stored in the memory of the at least one detection sensor.

10. The inspection system of claim 7, further comprising the step of inducing an excitation into the tubulars and detecting the response of said excitation through said at least one detection sensor.

11. The inspection system of claim 10, wherein said excitation is controlled by said at least one computer.

12. The inspection system of claim 7, wherein said at least one set of constrains further comprise inspection criteria, and/or baseline data comprising data from known imperfections in tubulars, and/or historical data comprising data previously gathered from the tubulars being inspected, and wherein said inspection criteria, and/or baseline data, and/or historical data are inputted into said at least one computer to manage and evaluate said emitted signals.

13. The inspection system of claim 12, wherein said historical data is compiled from a prior non analogous inspection technique, and wherein said historical data is inputted into said at least one computer, to manage and evaluate said emitted signals.

14. A method for inspecting a material for imperfections comprising:

inducing an excitation into the material being inspected for imperfection and detecting the response of said excitation with at least one imperfection detection sensor; wherein the inducing of the excitation is controlled by at least one computer;

producing an output from said at least one imperfection detection sensor, said output comprising at least one imperfection signal in a time-varying electrical form;

communicating said output to said at least one computer, said at least one computer having at least one imperfection detection interface;

band limiting said at least one imperfection signal, wherein said band limiting comprises passing said at least one imperfection signal through at least one filter;

converting said at least one imperfection signal to a digital format;

inputting at least one set of constrains into said at least one computer, wherein said at least one set of constrains are evaluated by said at least one computer for recognizing the types of imperfections detected by said at least one imperfection detection sensor; and storing said at least one set of constrains and/or said output into at least one memory storage, and wherein said recognizing the types of imperfections further comprises at least one mathematical array of coefficients, wherein said coefficients comprise converted and/or decomposed signals from said at least one imperfection detection sensor, and/or baseline data comprising data from known material imperfection, and/or historical data comprising data previously gathered from the material being inspected, wherein the converted at least one imperfection signal is processed by said at least one computer using a mathematical array of coefficients and constants, wherein said coefficients comprise converted signals from said at least one imperfection detection sensor, and wherein said constants are derived, at least in part from baseline data comprising data from known material imperfection, and/or historical data comprising data previously gathered from the material being inspected.

15. The method of claim 14, wherein said at least one memory storage is said at least one computer.

16. The method of claim 14, wherein said at least one memory storage comprises more than one memory storage, and wherein said at least one imperfection detection sensor comprises a memory storage.

17. The method of claim 14, further comprising the step of developing said coefficients, wherein said developing comprises inputting, into a database, parameters associated with a material being inspected.

18. The method of claim 17, wherein said parameters comprise physical characteristics of said material being inspected.

19. The method of claim 14, wherein the processing, of the converted at least one imperfection signals, by said at least one computer further comprises:

scaling the converted at least one imperfection signals, wherein said scaling accounts for variations in testing parameters;

decomposing the converted at least one imperfection signals, whereby said decomposing separates the converted at least one imperfection signals into components indicative of various imperfections; and generating identifiers by fusing the decomposed signal with parameters and/or database data and/or historical data associated with the material being inspected.

20. The method of claim 19, wherein said identifiers provide a prediction of the type of imperfection.

21. The method of claim 20, further comprises searching a database of prior information and/or identifiers, relating to the material being inspected, to implement an imperfection identification.

22. The method of claim 21, wherein said at least one computer analyzes said database of prior information and said identifiers to assign a preliminary determination of the imperfection.

23. The method of claim 22, wherein the preliminary determination is compared to baseline data comprising data from known material imperfection, and/or historical data comprising data previously gathered from the material being inspected to resolve conflicting determination of the imperfection.

24. The method of claim 23, wherein the resolving of conflicting determination of the imperfection comprises assigning a determination based on the substantial criticality of the imperfection to the material being inspected.

25. The method of claim 24, further comprising a re-evaluation and resolution of said conflicting determination of the imperfection.

26. The method of claim 25, further comprising coding and storing new data in a decomposed signals database.

27. A method to recognize imperfections in materials comprising:
operating an imperfection detection sensor, wherein the imperfection detection sensor emits an electronic signal regarding an element to be inspected;
band limiting said electronic signal, wherein said band limiting comprises passing said electronic signal through at least one filter;
scaling said electronic signal, wherein said scaling accounts for variations in testing parameters;
converting said electronic signal into a digital signal;
inputting said digital signal into at least one computer;
de-noising said digital signal, wherein said de-noising comprises separation and/or removal of a component of said digital signal;
decomposing said digital signal into components indicative of various imperfections;
calculating at least one first identifier from said components indicative of various imperfections, wherein said calculating is performed by said at least one computer;
comparing said at least one first identifier to a pre-established identifier, wherein said pre-established identifier is stored in a pre-established database; and
recognizing an imperfection from said comparison, wherein said recognition is performed by said at least one computer, and wherein said recognition is stored in said pre-established database and/or outputted from said at least one computer.

28. The method of claim 27, further comprising the step of resolving a recognition conflict.

29. The method of claim 27, further comprising the step of resolving an instability in the recognition of said imperfection, wherein instability comprises recognizing more than one imperfection during said comparison.

30. The method of claim 27, further comprising the step of inducing an excitation into a material and detecting the response of said excitation through said imperfection detection sensor; wherein the inducing of the excitation is controlled by said at least one computer.

31. A method to inspect materials for imperfections comprising:
operating an imperfection detection sensor, said imperfection detection sensor in communication with a material being inspected, wherein the imperfection detection sensor emits an electronic signal regarding an element to be inspected;
band limiting said electronic signal, wherein said band limiting comprises passing said electronic signal through at least one filter;
scaling said electronic signal, wherein said scaling accounts for variations in testing parameters;
converting said electronic signal into a digital signal;
inputting said digital signal into at least one computer;
de-noising said digital signal, wherein said de-noising comprises separation and/or removal of a component of said digital signal;
decomposing said digital signal into a component indicative of various imperfections;
calculating at least one first identifier from said component indicative of various imperfections, wherein said calculating is performed by said at least one computer through a mathematical array;
comparing said at least one first identifier to a pre-established identifier, wherein said pre-established identifier is stored in a pre-established database; and
recognizing an imperfection from said comparison, wherein said recognition is performed by said at least one computer, and wherein said recognition is stored in said pre-established database and/or outputted from said at least one computer.

32. The method of claim 31, further comprising the step of resolving a recognition conflict.

33. The method of claim 31, further comprising the step of resolving an instability in the recognition of said imperfection, wherein instability comprises recognizing more than one imperfection during said comparison.

34. The method of claim 31, further comprising the step of inducing an excitation into a material and detecting the response of said excitation through said imperfection detection sensor; wherein the inducing of the excitation is controlled by said at least one computer.

35. A method to inspect materials for locating desired characteristics comprising:
operating a detection sensor, wherein the detection sensor emits an electronic signal regarding an element to be inspected;
band limiting said electronic signal, wherein said band limiting comprises passing said electronic signal through at least one filter;
scaling said electronic signal, wherein said scaling accounts for variations in testing parameters;
converting said electronic signal into a digital signal;
inputting said digital signal into at least one computer;
de-noising said digital signal, wherein said de-noising comprises separation and/or removal of a component of said digital signal;
decomposing said digital signal into components indicative of various characteristics;
calculating at least one first identifier from said components indicative of various characteristics, wherein said calculating is performed by said at least one computer through a mathematical array;

comparing said at least one first identifier to a pre-established identifier, wherein said pre-established identifier is stored in a pre-established database; and recognizing a characteristic from said comparison, wherein said recognition is performed by said at least one computer, and wherein said recognition is stored in a said pre-established database and/or outputted from said at least one computer.

36. The method of claim 35, further comprising the step of resolving a recognition conflict.

37. The method of claim 35, further comprising the step of resolving an instability in the recognition of said characteristic, wherein instability comprises recognizing more than one characteristic during said comparison.

38. The method of claim 35, further comprising the step of inducing an excitation into a material and detecting the response of said excitation through said detection sensor; wherein the inducing of the excitation is controlled by said at least one computer.

* * * * *